United States Patent Office 2,833,764
Patented May 6, 1958

2,833,764

O-METHYL-L-TYROSYL AMIDES AND THEIR PREPARATION

Bernard Randall Baker and Henry Marcell Kissman, Nanuet, N. Y., assignors to American Cyanamid Company, New York, N. Y., a corporation of Maine No Drawing. Application November 18, 1954
Serial No. 469,838

6 Claims. (Cl. 260—247.2)

This invention relates to a new series of organic compounds. More particularly, this invention is concerned with O-methyl-L-tyrosyl amides, salts thereof and methods of their preparation.

The compounds embraced within the scope of this invention may be represented by the following general formula:

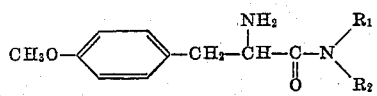

wherein $R_1$ and $R_2$ are members selected from the group consisting of hydrogen, alkyl, aryl, aralkyl, hydroxyalkyl, cycloalkyl and heterocyclic radicals. It is to be understood that substituents in the $R_1$ and $R_2$ positions may vary widely within the limits prescribed above without departing from the intended scope of the invention. Thus, as an example, substituents on the nitrogen may be monoalkyl, dialkyl, alkylaryl, arylalkyl, and so on. Specific examples of each of the substitutable radicals are as follows: alkyl-methyl, ethyl, propyl, isopropyl, butyl, isobutyl, and pentyl; aryl-phenyl, p-chlorophenyl, p-bromophenyl, p-methoxyphenyl and p-ethoxyphenyl; aralkyl-benzyl, phenethyl, and naphthylmethyl; cycloalkyl-cyclohexyl, 3-methylcyclohexyl, 4-ethylcyclohexyl, 3-methoxycyclohexyl, 4-ethoxycyclohexyl and 2-chlorocyclohexyl; hydroxyalkyl-hydroxymethyl, hydroxyethyl, hydroxypropyl, β-hydroxypropyl, hydroxybutyl and β-hydroxybutyl; heterocyclic-morpholino, piperidino, and pyrrolidino.

The compounds of the present invention have considerable activity against a variety of microorganisms of the Gram-positive and Gram-negative class. When tested in accordance with the agar-dilution technique, the compounds exhibited activity against *Mycobacterium tuberculosis, Bacillus subtilis, Staphylococcus aureus, Proteus vulgaris, Sarcina lutea, Pseudomona aeroginosa* and *Escherichia colae.* Samples of each of the compounds were prepared in serial dilutions in agar and sterilized. The molten agar was poured into plates, allowed to harden and a standard culture of each of the organisms against which the samples were to be tested was streaked on the surface of the plates. It was found that the new compounds completely inhibit the growth of the above-mentioned microorganisms in concentrations varying from 0.5 to 1.0 mgms. per ml. of agar.

It has also been determined that, in addition to their antibacterial activity, the compounds of the present invention are effective antiprotozoal agents. This property has been demonstrated by inoculating tubes of sterile nutrient media containing various concentrations of the subject compounds with a species of pathogenic protozoa such as, for example, *Trichomonas foetus.* After a 48-hour period of incubation, the tubes were observed for growth of the pathogen by direct microscopic examination with a hemocytometer and compared with the amount of growth obtained under the same conditions in a basal medium to which no test compound has been added. The new compounds were found to be active in concentrations varying from about 5 gamma to 25 gamma per ml. of nutrient medium.

To those skilled in the art, several methods may occur for the preparation of the compounds of this invention. However, we have discovered a particularly useful method and it is intended that it be included within the scope of the invention. In accordance with our process, O-methyl-N-phthalyl-L-tyrosine is converted to the acid halide by treatment with the appropriate phosphorus halide in the presence of an inert, neutral organic solvent. Thus, if an acid chloride is desired, the N-blocked amino acid is treated with phosphorus pentachloride or phosphorus trichloride in the presence of ether, dioxane, dimethylformamide, ethylene glycol, dibutyl ether acetone, or like solvents. If desired, the acid bromide may be prepared instead by employing the corresponding phosphorus derivative as the halogenating reagent.

The O-methyl-N-phthalyl-L-tyrosyl halide may be converted to the acid amide by condensation with an amine base having at least one available reactive hydrogen—namely, a primary amine, a secondary amine or ammonia. To obtain the primary, secondary or tertiary amines corresponding to those in the generic formula shown above, one need only employ the appropriate amine for condensation with the acid halide.

The amination reaction is preferably conducted in the presence of an inert, non-acidic solvent at temperatures ranging from —10° C. up to the boiling point of the reaction mixture. Suitable solvents are: chloroform; dioxane; ether; the lower alkyl alcohols such as methyl, ethyl, propyl, or butyl; dimethylformamide or the tertiary amines as triethylamine or pyridine. Optimal yields of products were found to be obtained in the temperature range 0° C. to 25° C. In some cases the reaction reaches completion spontaneously, in others a slightly longer period should be allowed. One hour is considered adequate in most instances.

It is preferred that a quantity of base such as sodium or potassium hydroxide be employed in order to ensure neutralization of the halo acid liberated during the course of the reaction. This precaution may be dispensed with if a tertiary amine such as pyridine is used as the organic solvent in which case an excess of the tertiary amine will satisfy the requirement.

The O-methyl-N-phthalyl-L-tyrosyl amide may now be subjected to hydrolysis to remove the phthalyl blocking group. An appropriate reagent for this purpose is hydrazine hydrate which forms the hydrazide of a phthalamic acid. When this compound is heated in the presence of an acid, transamidation takes place, resulting in the formation of phthalylhydrazide and the acid salt of the free amine. The latter may then be suitably neutralized with a weak base such as an alkali metal carbonate or bicarbonate and extracted into an inert organic solvent such as chloroform, dioxane or a lower alkyl alcohol.

The time required for heating the N-blocked amino acid amide with hydrazine hydrate depends upon the nature of the substituents on the acid amide. Generally, a period of 10 to 20 minutes is adequate in most cases. However, when aryl and aralkyl substituents have been attached in the acid amide position no particular care need be exercised in regard to the time of heating inasmuch as these groups are stable and are not readily removable by hydrazinolysis. When any other substituents have been attached to the acid amide position, it is preferred that the time of reaction not exceed a period beyond about a half-hour, since excessive heating is detrimental and leads to low yields.

The acid of choice for the complete removal of the phthalyl group is one which will not affect the amide group. We have found that glacial acetic acid is best for this purpose, although mineral acids such as hydrochloric or sulfuric may be advantageously employed provided that they are used in very dilute concentration. Non-mineral acids such as formic or propionic may be suitably employed without excessive precautions as to the concentrations used. A difficulty to be expected if a strong acid is employed for the removal of the phthalyl group is the hydrolysis of the amide function resulting either in a low yield or a total loss of product.

The solvent preferred for the hydrazinolysis reaction is one that can be generally characterized as being capable of dissolving both the starting material and the hydrazine. We have found the commercially available methyl Cellosolve to be best suited for this purpose, although dioxane or one of the high boiling ethers such as dibutyl ether is equally useful.

We have found that best yields are obtained when the temperature during the reaction does not exceed steam bath temperature. Although the process can be carried out with temperatures in excess of this limit, lower yields are obtained.

Optimal yields of product usually result when a stoichiometric quantity of hydrazine hydrate, or a slight excess, is employed. A large excess of reagent results in side reactions which involve cleavage of the amide group and result in a loss of product. As a general rule, a quantity of from about 2% to about 5% above the required molecular equivalent is adequate.

The reagent to be employed for the removal of the phthalyl function need not be limited to hydrazine hydrate. Various derivatives of hydrazine such as, for example, phenylhydrazine, p-nitrophenylhydrazine or p-bromophenylhydrazine may be employed with equally satisfactory results.

The manner of converting the acid salt obtained after the removal of the phthalyl group may be advantageously accomplished by stirring the reaction product with a strongly basic ion exchange resin. The latter picks up the acid leaving the relatively pure organic base in solution. A suitable ion exchange resin to be employed for this purpose is that available under the trademark "IRA-400 Amberlite." In cases where the amides are not water-soluble, as for example, the anilide derivative, a suitable alternative procedure is to neutralize the reaction product with a weak base such as an alkali metal carbonate or bicarbonate and then extract the base into a water-immiscible organic solvent such as chloroform, ethyl acetate, methylene chloride or butanol.

Since the compounds of the present invention have an available free amino group, they are basic in character. All of the compounds are readily soluble in water except the aryl, aralkyl, and organic cyclohexyl derivatives which are only very slightly soluble in water. All are soluble in varying degrees in solvents such as chloroform, ethyl acetate, ethanol and ether. The compounds may be readily converted to water soluble salts upon reaction with mineral acids or organic acids, as for example, hydrochloric, sulfuric, phosphoric, acetic, propionic, tartaric, malonic, succinic, citric or glutaric. They are extremely stable in the form of bases. All are crystalline solids except the morpholino derivative which is oily. Their melting points are of a relatively low order.

The following examples are representative of the compounds contemplated by the present invention. They are intended to be merely exemplary and not limitative upon the scope of the invention. All parts are by weight unless otherwise specified.

Example I

A solution of 2.64 parts by weight of O-methyl-N-phthalyl-L-tyrosine in 22 parts by volume of anhydrous ether was stirred in an ice bath for 10 minutes. There was added 1.77 parts by weight of phosphorous pentachloride. Stirring was continued for 30 minutes in the ice bath, and then for 1 hour at room temperature. The clear solution was evaporated under reduced pressure and the residue was freed from traces of phosphorous oxychloride by a double evaporation with toluene under reduced pressure. The residual O-methyl-N-phthalyl-L-tyrosyl chloride (Helv. Chim. Acta 34, 744 (1951)), was taken up in 60 parts by volume of chloroform and there was added 2.25 parts by volume of aniline. The mixture was stirred at room temperature for 30 minutes and was then diluted with another 60 parts by volume of chloroform. The solution was washed with successive portions of 1 N hydrochloric acid, water, sodium bicarbonate solution and water. It was then dried over magnesium sulfate, filtered and evaporated under reduced pressure. The residue was crystallized from methylene chloride-ether to yield 89% of O-methyl-N-phthalyl-L-tyrosine anilide, melting point 180° C. to 183° C. The compound is soluble in chloroform, ethyl acetate and ethanol. It is only slightly soluble in ether and is insoluble in hexane or water.

To a suspension of 0.4 part by weight of O-methyl-N-phthalyl-L-tyrosine anilide in 3 parts by volume of methyl Cellosolve was added 0.053 part by volume of hydrazine hydrate and the mixture was heated on the steam bath for 1.5 hours. There was then added 0.2 part by volume of glacial acetic acid in 3 parts by volume of methyl Cellosolve and heating was continued for 15 minutes. The mixture was evaporated under reduced pressure and the residue was mixed with 0.1 N hydrochloric acid and was filtered from undissolved material. The filtrate was brought to pH 7 to 8 with solid sodium bicarbonate and the solution was extracted with three 15 parts by volume portions of chloroform. The chloroform solution was dried over magnesium sulfate and, after filtration, the solvent was removed under reduced pressure. This left 0.14 part by weight of residue which could be crystallized from ether-pentane and which was recrystallized from ether-hexane to yield 21% of O-methyl-L-tyrosine anilide, melting point 116° C. to 117° C. The compound is soluble in chloroform, ethyl acetate and ether. It is insoluble in hexane and only very slightly soluble in water.

Example II

To a mixture of 0.4 part by weight of O-methyl-N-phthalyl-L-tyrosine anilide in 4 parts by volume of methyl Cellosolve was added 0.212 part by volume of hydrazine hydrate and the mixture was heated on the steam bath with stirring for two hours. There was added 0.4 part by volume of glacial acetic acid in 3 parts by volume of methyl Cellosolve and stirring and heating were continued for 15 minutes. The reaction mixture was evaporated under reduced pressure and the residue was triturated with 1 N hydrochloric acid and filtered. The filtrate was made alkaline with solid sodium bicarbonate and this mixture was extracted with four 15 parts by volume portions of chloroform. The chloroform solution, which had been dried over magnesium sulfate, was evaporated under reduced pressure and the residual gum which crystallized spontaneously was triturated with a little ether and was collected by filtration. There was obtained 82% of crystalline O-methyl-L-tyrosine anilide, melting point 119° C. to 122° C. Recrystallization from ether with activated charcoal yielded material with melting point 119° C. to 120° C.

Example III

To a hot suspension of 0.4 part by weight of O-methyl-N-phthalyl-L-tyrosine anilide in 0.8 part by volume of methyl Cellosolve was added 0.05 part by volume of hydrazine hydrate. The solid went into solution upon further heating on the steam bath and after 15 minutes of heating there was added 0.8 part by volume of methyl Cellosolve and 0.2 part by volume of glacial acetic acid. The mixture was heated for an additional 15 minutes and was then evaporated to dryness under reduced pressure. The residue was triturated with a little methanol and filtered. The filtrate was evaporated under reduced pressure, the residue mixed with 0.5 N hydrochloric acid and filtered from traces of insoluble material. The filtrate was saturated with sodium bicarbonate and extracted with five portions of chloroform. The combined extracts were dried over magnesium sulfate, filtered and freed from solvent under reduced pressure. This left an oily residue which crystallized when triturated with absolute ether. The solid was collected by filtration and recrystallized from methylene chloride-ether to afford a 78% yield of O-methyl-L-tyrosine anilide, melting point 119° C. to 120° C.

*Example IV*

To a solution of O-methyl-N-phthalyl-L-tyrosyl chloride obtained from 1.14 parts by weight of O-methyl-N-phthalyl-L-tyrosine as described in Example I, in 15 parts by volume of chloroform was added 0.9 part by volume of benzylamine. The mixture was stirred in an ice bath for 30 minutes and at room temperature for 1 hour. There was then added 70 parts by volume of chloroform and the suspension was washed with successive portions of water, 1 N hydrochloric acid, sodium bicarbonate solution and water. Each aqueous fraction was back-extracted with chloroform and the combined chloroform solutions were dried over magnesium sulfate. Evaporation of the filtered solution under reduced pressure left a solid residue which was triturated with ether and collected by filtration to afford 73% of O-methyl-N-phthalyl-L-tyrosine benzylamide, melting point 142° C. to 147° C. Recrystallization from cyclohexane-chloroform and from benzene yield material which after drying at 100° C. over $P_2O_5$ under reduced pressure had a melting point of 170° C. to 173° C. The substance is soluble in ethanol, ethyl acetate, and chloroform. It is insoluble in ether or water.

To a solution of 0.414 part by weight of O-methyl-N-phthalyl-L-tyrosine benzylamide in 4 parts by volume of warm methyl Cellosolve was added 0.212 part by volume by hydrazine hydrate and the mixture was heated on the steam bath for 1.5 hours. There was added a solution of 0.4 part by volume of glacial acetic acid in 3 parts by volume of methyl Cellosolve and heating was continued for 30 minutes. The mixture was then evaporated under reduced pressure and the residue was triturated with 0.5 N hydrochloric acid and was filtered. The filtrate was saturated with solid sodium bicarbonate and the mixture was extracted with five 15 parts by volume portions of chloroform. The extracts were dried over magnesium sulfate, filtered and freed from solvent under reduced pressure. The residual oil solidified spontaneously. It was recrystallized from absolute ether to afford O-methyl-L-tyrosine benzylamide, melting point 89° C. to 90° C. Further recrystallization from ether and drying did not change that melting point. The substance is soluble in chloroform, ethanol, and aqueous acid. It is only slightly soluble in ether and insoluble in hexane.

*Example V*

To a hot solution of 0.414 part by weight of O-methyl-N-phthalyl-L-tyrosine benzylamide in 0.8 part by volume of methyl Cellosolve was added 0.05 part by volume of hydrazine hydrate and heating on the steam bath was continued for 15 minutes. There was then added 0.8 part by volume of methyl Cellosolve and 0.12 part by volume of glacial acetic acid. The suspension was again heated on the steam bath for 15 minutes, after which time it was evaporated under reduced pressure. The residue was triturated with a little methanol and filtered. The filtrate was evaporated under reduced pressure, and the residue mixed with 0.5 N hydrochloric acid and filtered. The undissolved material was washed with a little more acid and the combined filtrates were saturated with sodium bicarbonate. The mixture was extracted with five 5 parts by volume portions of chloroform and the combined extracts were dried over magnesium sulfate, filtered and freed from solvent under reduced pressure. The residue crystallized spontaneously and was triturated with a little ether, collected by filtration and dried under reduced pressure to yield O-methyl-L-tyrosine benzylamide, melting point 86° C. to 89° C. Recrytallization from methylene chloride-ether yielded material with the melting point 89° C. to 90° C.

*Example VI*

An ice cold solution of O-methyl-N-phthalyl-L-tyrosyl chloride, prepared from 6.50 parts by weight of O-methyl-N-phthalyl-L-tyrosine as described in Example I, in 120 parts by volume of chloroform was saturated with ammonia gas and was then stirred in an ice bath for 30 minutes and at room temperature for 1 hour. Another 80 parts by volume of chloroform was added to the suspension and the mixture was washed with successive portions of water, 1 N hydrochloric acid and water. Each aqueous fraction was back-extracted with chloroform. The combined chloroform extracts were dried over magnesium sulfate, filtered and freed from solvent under reduced pressure. The residual solid was triturated with absolute ether and collected by filtration. There was obtained a 96% yield of O-methyl-N-phthalyl-L-tyrosine amide, melting point 183° C. to 184° C. A sample recrystallized from methylene chloride-ether melted at 182° C. to 183° C. The substance is soluble in ethyl acetate, chloroform and ethanol. It is only slightly soluble in ether and is insoluble in hexane or water.

To a mixture of 0.324 part by weight of O-methyl-N-phthalyl-L-tyrosine amide and 4 parts by volume of methyl Cellosolve was added 0.217 parts by volume of hydrazine hydrate. The suspension was heated on the steam bath for 1.5 hours and then there was added 0.4 part by volume of glacial acetic acid in 3 parts by volume of methyl Cellosolve and the solution was again heated on the steam bath for 30 minutes. It was then evaporated under reduced pressure and the residue was triturated with methanol and filtered. The filtrate was diluted with 20 parts by volume of water and 10 parts by volume of methanol and the solution was stirred with IRA-400 (hydroxyl form) anion exchange resin until the pH of the supernatant reached a value of 8 to 9. The resin was removed by filtration and was washed with 50% aqueous methanol. The filtrate and washings were evaporated under reduced pressure with the bath temperature not going above 55° C. The residue was crystallized from methylene chloride-ether and there was obtained a solid having a melting point of 95° C. to 99° C. Additional crystallization from large amounts of absolute ether yielded 29% of O-methyl-L-tyrosine amide, melting point 99° C. to 100° C. One more recrystallization from ether raised the melting point to 105° C. to 107° C. The compound is soluble in chloroform, ethyl acetate and water. It is only slightly soluble in dry ether and is insoluble in pentane or hexane.

*Example VII*

To a hot solution of 3.24 parts by weight of O-methyl-N-phthalyl-L-tyrosine amide in 8 parts by volume of methyl Cellosolve was added 0.48 part by volume of hydrazine hydrate. Heating on the steam bath was continued for 15 minutes and there was then added 2 parts by volume of glacial acetic acid in 8 parts by volume of methyl Cellosolve. The suspension was heated for another 15 minutes and was evaporated to dryness under reduced pressure. The residue was triturated with methanol and freed from solid by filtration. The solid was washed with a small amount of methanol and filtrate and washings were evaporated under reduced pressure. The residue was mixed with 50 parts by volume of distilled water and was filtered. The clear filtrate was stirred with IRA-400 anion exchange resin (hydroxyl form) until the supernatant had become alkaline. The resin was removed by filtration and was washed with water. Filtrate and washings were combined and evaporated under reduced pressure with the bath temperature not going above 40° C. The residual gum was dried under reduced pressure over phosphorous pentoxide, and dissolved in chloroform. The solution was treated with a little magnesium sulfate and was filtered and freed from the solvent under reduced pressure. The residue was crystallized from methylene chloride-ether and there was obtained a 66% yield of O-methyl-L-tyrosine amide, melting point 103° C. to 105° C.

*Example VIII*

To a stirred, ice-cooled solution of O-methyl-N-phthalyl-L-tyrosyl chloride, obtained from 3.38 parts by weight of O-methyl-N-phthalyl-L-tyrosine as described in Example I, in 30 parts by volume of chloroform was added dropwise over a period of 15 minutes a solution of 1.39 parts by volume of ethanolamine in 15 parts by volume of chloroform. The mixture was stirred in the ice bath for an additional 30 minutes and then at room temperature for 40 minutes. There was then added 20 parts by volume of chloroform and the suspension was washed with water, 0.5 N hydrochloric acid and sodium bicarbonate solution. The aqueous fractions were back-extracted with chloroform and the combined chloroform solutions were dried over magnesium sulfate, filtered and freed from solvent under reduced pressure. The residue was crystallized from ether-methylene chloride with activated charcoal to afford an 84% yield of O-methyl-N-phthalyl-L-tyrosine β-hydroxyethyl amide, melting point 87° C. to 89° C. Recrystallization from the same solvents gave material with melting point 90° C. to 91° C. The substance is soluble in chloroform and ethyl acetate. It is insoluble in water or ether.

To a hot solution of 1.58 parts by weight of O-methyl-N-phthalyl-L-tyrosine β-hydroxyethyl amide in 3.4 parts by volume of methyl Cellosolve was added 0.206 part by volume of hydrazine hydrate. Heating on the steam bath was continued for 12 minutes and then there was added 0.86 part by volume of glacial acetic acid in 2.5 parts by volume of methyl Cellosolve. The mixture was heated for the 10 minutes and was then evaporated to dryness under reduced pressure. The residue was triturated with methanol, filtered and the solid precipitate was washed with a small amount of methanol. Filtrate and washings were combined and evaporated under reduced pressure. This left a residue which was taken up in water, filtered, and treated with IRA-400 anion exchange resin (hydroxyl form) until the supernatant became basic. The mixture was filtered and the resin was washed with a little water. Evaporation of the filtrate under reduced pressure gave an oily residue which was dissolved in chloroform, dried over magnesium sulfate and filtered. The filtrate was once more evaporated under reduced pressure and the residual gum was crystallized from ether-methylene chloride to afford a 46% yield of O-methyl-L-tyrosine β-hydroxyethylamide, melting point 75° C. to 78° C. Recrystallization from the same solvent pair afforded material with melting point 73° C. to 74° C. The substance is soluble in ethyl acetate, chloroform and water and is only slightly soluble in ether and insoluble in pentane.

*Example IX*

To an ice cold, stirred solution of O-methyl-N-phthalyl-L-tyrosyl chloride obtained from 3.45 parts by weight of O-methyl-N-phthalyl-L-tyrosine as described in Example I, in 30 parts by volume of chloroform, was added 2.03 parts by volume of morpholine. Stirring was continued for 30 minutes in the ice bath and then for 1 hour at room temperature. The mixture was diluted with 30 parts by volume of chloroform, and was washed with water, 0.5 N hydrochloric acid, water, sodium bicarbonate solution and water. The aqueous fractions were back-extracted with chloroform and the combined chloroform solutions were dried over magnesium sulfate, filtered and the filtrate was freed from solvent under reduced pressure. The solid residue was thoroughly triturated with ether and filtered. There was obtained a 91% yield of O-methyl-N-phthalyl-L-tyrosine morpholide, melting point 165° C. to 169° C. Recrystallization from hexane-methylene chloride afforded material with melting point 167° C. to 168° C. The substance is soluble in chloroform, ethyl acetate, acetonitrile and slightly soluble in ether. It is insoluble in hexane and in water.

To a hot solution of 1.97 parts by weight of O-methyl-N-phthalyl-L-tyrosine morpholide in 4 parts by volume of methyl Cellosolve was added 0.24 part by volume of hydrazine hydrate and the mixture was heated on the steam bath for 14 minutes. There was then added 1 part by volume of glacial acetic acid in 4 parts by volume of methyl Cellosolve and heating was continued for 15 minutes. The mixture was evaporated under reduced pressure and the residue was triturated with methanol and filtered. The filtrate was evaporated under reduced pressure and the residue was mixed with 0.5 N hydrochloric acid and filtered from insoluble gum. The filtrate was saturated with sodium bicarbonate and the mixture was extracted with five 15 parts by volume portions of chloroform. The chloroform extracts were dried over magnesium sulfate, filtered and evaporated under reduced pressure. The residual oil was purified by solution in warm ether, decantation from a small amount of insoluble gum and filtration through a layer of activated charcoal. The filtrate, on partial evaporation and cooling, deposited a 55% yield of O-methyl-L-tyrosine morpholide as a mobile colorless oil. The substance is soluble in chloroform, ether and water, and is insoluble in pentane.

*Example X*

To a cold stirred solution of O-methyl-N-phthalyl-L-tyrosyl chloride, obtained from 6.51 parts by weight of O-methyl-N-phthalyl-L-tyrosine as described in Example I, in 100 parts by volume of chloroform was added 5.05 parts by volume of cyclohexylamine. Stirring was continued at room temperature for 1 hour and the mixture was then washed with water, 1 N hydrochloric acid, water and aqueous sodium bicarbonate solution. The chloroform solution was dried over magnesium sulfate, filtered and evaporated under reduced pressure. The residue crystallized upon trituration with absolute ether. Filtration and drying under reduced pressure afforded a 90% yield of O-methyl-N-phthalyl-L-tyrosine cyclohexylamide, melting point 148° C. to 150° C. The substance is soluble in chloroform, ethyl acetate and ethanol, but is only slightly soluble in ether and is insoluble in water.

To a hot solution of 0.812 part by weight of O-methyl-N-phthalyl-L-tyrosine cyclohexylamide in 1.6 parts by volume of methyl Cellosolve was added 0.102 part by volume of hydrazine hydrate and the mixture was heated on the steam bath for 15 minutes. There was then added 1.6 parts by volume of methyl Cellosolve and 0.4 part by volume of glacial acetic acid and heating was continued for another 15 minutes. The suspension was evaporated under reduced pressure and the solid residue was triturated with methanol and filtered. The filtrate was once more evaporated under reduced pressure and the residue was mixed with 20 parts by volume of 0.5 N hydrochloric acid and filtered. The filtrate was saturated with sodium bicarbonate and was then extracted with four 10 parts by volume portions of chloroform. The extracts were dried over magnesium sulfate, filtered and freed from solvent under reduced pressure, yielding a gum which crystallized spontaneously. Recrystallization from ether-hexane afforded a 64% yield of O-methyl-L-tyrosine cyclohexylamide, melting point 75° C. to 76° C. The compound is soluble in chloroform, ether or ethyl acetate. It is only slightly soluble in hexane and in water.

We claim:

1. Compounds selected from the group consisting of those having the general formula:

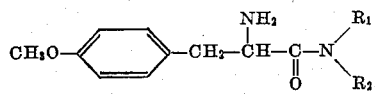

wherein $R_1$ and $R_2$ are members selected from the group consisting of hydrogen, phenyl-lower-alkyl, hydroxy-lower-alkyl and cyclohexyl radicals and $R_1$ and $R_2$ together are the morpholide radical, and acid addition salts thereof.

2. The new compound O-methyl-L-tyrosine benzylamide.

3. The new compound O-methyl-L-tyrosine amide.

4. The new compound O-methyl-L-tyrosine β-hydroxyethylamide.

5. The new compound O-methyl-L-tyrosine morpholide.

6. The new compound O-methyl-L-tyrosine cyclohexylamide.

References Cited in the file of this patent

Balenovic et al.: Helvetica Chimica Acta., vol. 34, pp. 744–47, 1951.

Koenigs et al.: Berichte der deutschen chemischen gesellschaft, vol. 41, page 4441, 1908.